A. V. GULLBORG.
LUBRICATING APPARATUS.
APPLICATION FILED APR. 21, 1919.
1,333,412. Patented Mar. 9, 1920.
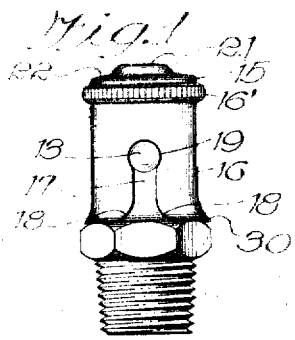 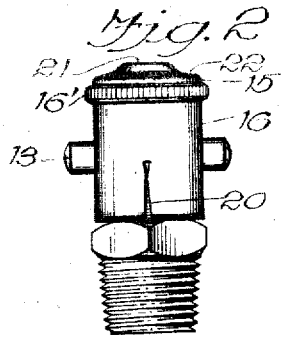 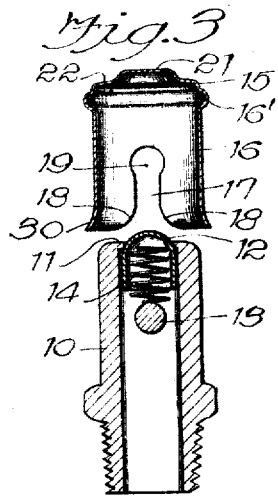
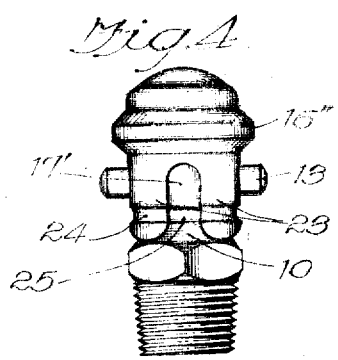 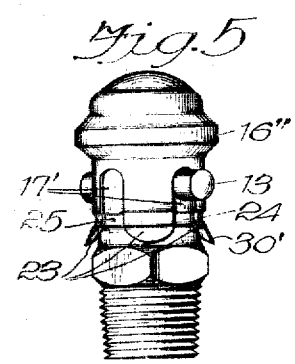 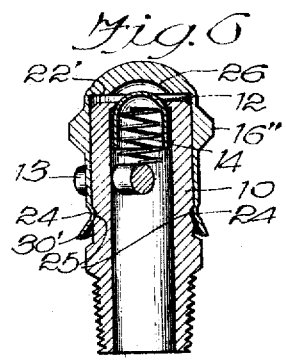
Witnesses:
Inventor
Arthur V. Gullborg
By Williams, Bradbury & Lee
Attys.

UNITED STATES PATENT OFFICE.

ARTHUR V. GULLBORG, OF CHICAGO, ILLINOIS.

LUBRICATING APPARATUS.

1,333,412.  Specification of Letters Patent.  Patented Mar. 9, 1920.

Application filed April 21, 1919. Serial No. 291,777.

*To all whom it may concern:*

Be it known that I, ARTHUR V. GULLBORG, a citizen of the United States, residing at Chicago, in the county of Cook and State of Illinois, have invented certain new and useful Improvements in Lubricating Apparatus, of which the following is a full, clear, concise, and exact description, reference being had to the accompanying drawings, forming a part of this specification.

My invention relates to improvements in lubricating apparatus, and is particularly concerned with improvements in apparatus of the type disclosed in my copending applications Serial Nos. 216,586 and 267,858, filed February 11, 1918, and December 21, 1918, respectively.

In my applications above referred to I have disclosed a grease gun designed to supply lubricant under exceedingly high pressure, said grease gun being provided with a discharge conduit, and a coupling member designed to be attached to a bearing to be lubricated, the discharge conduit of said grease gun and the coupling member being provided with co-acting means for securing these members together so that lubricant can be forced through the coupling member into the bearing under very high pressure. My present invention relates to certain improvements in the coupling member disclosed in the above mentioned application.

In applying my coupling members to automobiles and similar apparatus, the coupling members are sometimes so located as to be exposed to dust and mud, and injury from accidental blows. If dust or mud accumulates on the ends of the coupling members, it is likely to be forced into the bearings when the lubricant is supplied thereto, and where the coupling members are positioned so as to be exposed to injury, the closures for the same or the seats for the closures may become deformed so as not to completely close the coupling member when the grease gun is detached therefrom.

The objects of my invention are to provide means to obviate the above objections to the structure disclosed in my prior applications; first, by providing means for excluding dust and dirt from the end of the coupling member which makes contact with the discharge conduit of the grease gun; second, by providing means for protecting the closure and the seat for the closure from injury; and third, by providing means of the character described, which is simple in construction, economical to manufacture, and easily attached to or detached from the coupling member.

These and other objects I accomplish by means of the structures disclosed in the accompanying drawings, in which—

Figure 1 is a side elevation of a coupling such as that disclosed in my co-pending applications above referred to, showing my novel cap applied thereto;

Fig. 2 is a view similar to Fig. 1 but taken at right angles thereto;

Fig. 3 is a longitudinal section through a coupling member and my improved means for excluding dust and dirt therefrom, the latter being shown separated from the coupling member;

Figs. 4 and 5 are views corresponding to Figs. 1 and 2, showing a modified form of my invention; and Fig. 6 is a central longitudinal section through the tubular member and the modified form of my invention showing the latter applied to the coupling member.

In the various views similar reference characters refer to similar parts.

Referring to the drawings, and for the present to Figs. 1, 2 and 3, which disclose the preferred embodiment of my invention, the reference character 10 indicates a tubular coupling member adapted to be connected with a bearing and serving to connect the discharge conduit of a grease gun with a bearing, as described in my co-pending applications above referred to. The upper end of the coupling member is flanged inwardly as shown at 11, to provide an intake port and a seat for the capsule shaped closure 12. A pin 13 extends through the walls of the coupling member and projects from both sides thereof to provide means for establishing a detachable connection between the coupling member and the discharge conduit of a grease gun, such as that disclosed in my above mentioned applications. A coiled spring 14 is interposed between the pin 13 and the closure 12, and tends to maintain the latter in its closed position. The particular closure herein described is illustrated and claimed in my application Serial No. 267,858 above referred to. It will be noted that it is made of comparatively thin metal, and it will therefore be clear that comparatively slight blows upon the outer end of this closure would deform it to such an extent as to render it unsuitable for the purpose for which it is designed.

In order to protect this closure from injury and also to prevent dust and dirt from accumulating thereon, and subsequently being forced into the bearing, I provide a cap, which comprises a top portion 15 and a flange portion 16. Keyhole openings are formed in the flange of said cap diametrically opposite from each other, the slots 17 of the keyhole openings having a width slightly less than the diameter of the pin 13. These slots open through the edge of the flange, the sides of the slots being curved away from each other, as indicated at 18, to provide guiding surfaces for expediting the engagement of the slots with the pins 13. The circular portions 19 of the keyhole openings are slightly larger in diameter than the pin 13. Located substantially midway between the keyhole openings, on each side of the cap, is a smaller slot 20. The slots 17 of the keyhole openings and the slots 20 provide spring tongues which permit the sides of the cap to spring slightly when the cap is pushed downwardly from the position shown in Fig. 3 to the position which it occupies in Figs. 1 and 2, so as to allow the ends of the pin 13 to pass through the slots 17. As soon as the ends of the pin 13 are positioned in the openings 19, the edges of the slots 17 are urged toward each other, due to the resiliency of the spring tongues, and provide yielding means for holding the cap upon the coupling member 10. The top of the cap is provided with a central offset portion 21, which receives the top of the closure 12, this portion being surrounded by an annular shoulder 22, which prevents the cap from being forced onto the coupling member so far as to cause the closure 12 to be opened. The flange 16 is beaded outwardly, as shown at 16', to provide means for forming a finger hold, so that the cap may be easily removed from the tubular member.

In the modified form of my invention disclosed in Figs. 4, 5 and 6, the flange of the cap is provided with a plurality of slots 17' arranged in oppositely disposed pairs, which form a plurality of spring tongues 23. The slots 17' are all of sufficient width to receive the ends of the pins 13. The free ends of the tongues 23 are provided with inwardly extending beads 24, so positioned that when the cap is placed upon the coupling member 10, they spring inwardly and engage the sides of an annular groove 25 formed in the outer wall of the coupling member 10. I thus provide means for yieldingly holding the cap upon the coupling member.

It will be noted that the cap disclosed in this modification is provided with a recess 26 in the top thereof, to provide a space for receiving the end of the closure 12, and is likewise provided with an annular shoulder 22', which will prevent the cap from being forced downwardly sufficiently to open the closure 12. I also provide this modification with a bead 16''' to facilitate the removal of the cap.

It will be noted that in both modifications the lower edge of the flange is flared outwardly, as shown at 30 in Fig. 3, and 30' in Fig. 6. This provides means for easily bringing the caps into registry with the ends of the coupling members.

While I have illustrated and described the details of the preferred embodiments of my invention, it is to be understood that my invention is not to be limited to these details, but is capable of other modifications within the scope of the appended claims.

Having thus described my invention, what I claim is:

1. The combination with a tubular coupling member having one end flanged over to provide a seat, a spring pressed closure for said seat, and a pin projecting from one side thereof, of a cap comprising top and flange portions, said flange portion having a keyhole opening formed in the flange thereof to receive said pin, a portion of the slot of said opening being of less width than said pin, and opening through the edge of said flange, the circular portion of said opening being larger than said pin, said flange being formed of elastic material, and the top of said cap being provided with means for preventing it from coming into contact with said closure.

2. The combination with a tubular coupling member having a pin projecting from one side thereof, of a cap comprising top and flange portions, said flange portion having a keyhole opening formed in the flange thereof to receive said pin, a portion of the slot of said opening being of less width than said pin, and opening through the edge of said flange, the circular portion of said opening being larger than said pin, said flange being formed of elastic material.

3. The combination with a tubular member, having an end provided with an inlet port, and a pin projecting from one side thereof, of a cap for said end, comprising top and flange portions, the said flange portion being provided with an opening for receiving said pin, and means for yieldingly holding said pin in said opening.

4. The combination with a tubular coupling member having an end provided with an intake opening and a closure for said intake opening, of a cap for said opening, having a spring tongue, and coacting means on said coupling member and said spring tongue for yieldingly holding said cap on said coupling member, the said coupling member and cap being provided with coacting means for preventing said cap from contacting with said closure.

In witness whereof I hereunto subscribe my name this 16 day of April, 1919.

ARTHUR V. GULLBORG.

Witnesses:
JOHN L. STEFFEN,
GEO. P. ADAMS.